Feb. 15, 1927.

W. A. MILLER

SILICA BRICK GUN

Filed March 17, 1925

1,617,959

WITNESSES

INVENTOR
William Allen Miller

Patented Feb. 15, 1927.

1,617,959

UNITED STATES PATENT OFFICE.

WILLIAM ALLEN MILLER, OF PITTSBURGH, PENNSYLVANIA.

SILICA BRICK GUN.

Application filed March 17, 1925. Serial No. 16,204.

This invention relates to mechanisms for packing granular material in molds. More particularly it relates to a gun for blowing moist granular material, such as silica, into molds, by fluid pressure.

The objects of the invention are to provide means by which ground-up silica and other granular material of like form, in a moistened condition, may be blown by air or steam pressure through a hose, or other suitable delivery conduit, into a form or mold, for the purpose of filling it and thoroughly packing the granular material into the cavity of the mold. Such material may run from dust up to one quarter inch in rough dimension, all mixed together as produced by the grinder.

Figure 1:
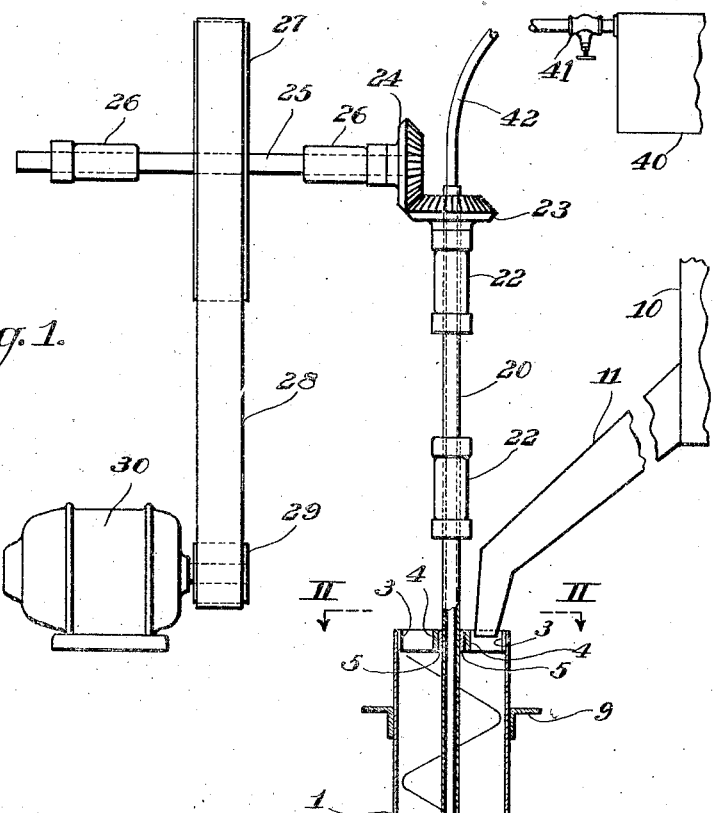
Figure 2:
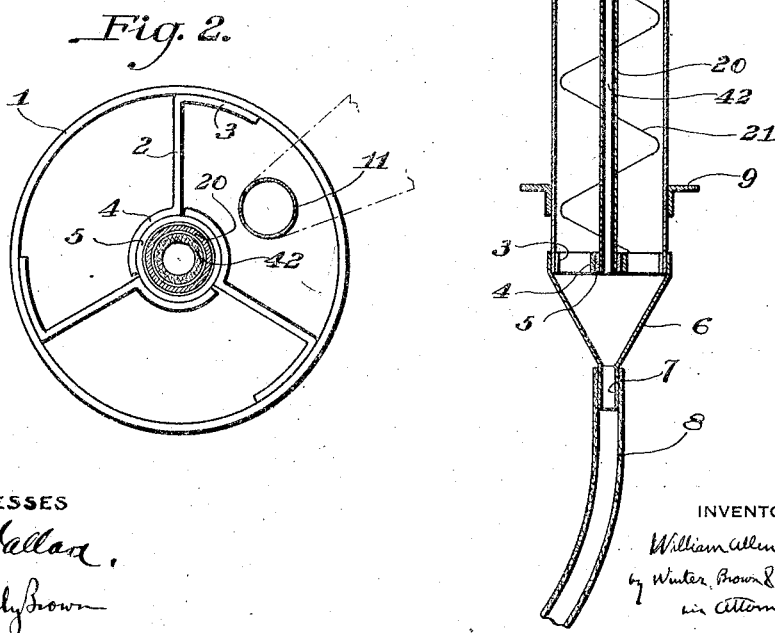

Referring to the drawings, Fig. 1 is a diagrammatic elevation and partial section of apparatus embodying this invention; and Fig. 2 is a plan view and partial section on the line II—II, Fig. 1.

In filling molds for the making of bricks and other shapes from silica, fire clay, magnesite, chrome ore, or like granular materials, it is necessary to tamp, shake, or otherwise press the granular material in order to make sure that the mold is completely filled and that there are no open spaces in the body of the granular material. Various mechanical means have been employed for this purpose, but these require labor and time for their operation. And the product is usually not uniform in density throughout the mold.

By the present invention I am able to blow the moistened granular material into the mold in a steady stream with a resulting impact and pressure that causes the moist material to fill all the corners and portions of the mold, while at the same time compressing the material in the mold so that no additional tamping or compression is necessary after it has been filled and leveled off. The uniform density thus secured produces a better product. In addition the conduit, preferably of flexible form such as a hose, may be moved around by the operator so as to direct the stream of material to any desired point. Further a number of stationary molds may be filled without moving either the molds or the filling apparatus, or the molds may be on a traveling rotary or other type of table or carrier.

Referring to the drawings the apparatus in the embodiment of my invention illustrated comprises a drum 1, preferably of cylindrical shape, open at both ends, and having in each end three radial members 2, each of which has an outer portion 3, bent to conform and to fit against the inner face of the drum 1; and an inner concentric portion 4, adapted to fit against and conform to the exterior of a cylindrical bearing ring 5. The portions 3 are attached to the drum 1 and the portions 4 are attached to the ring 5 all together forming a rigid spider at each end of the drum, as clearly shown diagrammatically in Fig. 1. The lower end of the drum has secured thereon a conical terminal member 6, the smaller end of which is formed into a cylindrical portion 7, upon which is secured a flexible hose 8. The drum 1 is mounted in any suitable frame or support by means of collars 9, attached to its exterior.

A hopper or storage bin 10 is adapted to contain the granular material to be fed through the gun, and a spout 11 leads from the hopper or storage bin 10 into the upper end of the drum 1. A hollow shaft 20 extends axially through the drum 1 and the bearing rings 5. Mounted upon this shaft within the drum is a spiral blade 21, forming a screw conveyor extending throughout the interior of the drum. The shaft 20 has fixed thereon suitable thrust bearings 22, 22, and a beveled gear 23. The latter member meshes with a similar gear 24, mounted upon a shaft 25, carried by bearings 26, 26, and carrying a pulley 27, adapted to be driven by a belt 28, which extends to the pulley 29 of a motor 30.

A source of compressed air is provided, such for example as a storage tank 40, controlled by valve 41, from which the air conduit 42 leads through the hollow shaft 20 to the end thereof on the lower side of the spider at the lower end of the drum 1.

The operation of this device is as follows: Granular material such as silica, magnesite, etc., which is to be made into bricks or shapes, or which is to be packed into any desired cavity, as for example to be made into molds for casting, is fed from the hopper 10 through the spout 11 into the drum 1. The rate of feeding of this granular material through the drum 1 is regulated by the rate of rotation of the screw 21, which in turn is regulated by the speed of the motor 30. As the granular material drops into the conical terminal member 6 at the lower end of the drum 1, it is driven through the hose 8 by the pressure of air, or other fluid, coming from the storage tank 40, through the pipe 42. The hose 8 being flexible, and of suitable length, may be moved around by the operator, and the blast of moist granular material may be directed to all corners of the mold or cavity that is to be filled. The granular material is discharged from the hose with great force, resulting in simultaneously packing the material and filling the mold. Consequently when the mold is filled and leveled off, no further steps need be taken to insure the proper compression or setting of the granular material.

By this apparatus brick molds, molds for special shapes, etc., may be filled much more rapidly, more certainly, and with more uniform density throughout, than by the methods heretofore used.

Although I have referred to the use of compressed air as the fluid, it will be understood that steam might be used in certain cases, or other forms of fluid pressure. Also other materials than powdered silica may be handled, and other receptacles than molds may be filled by this apparatus with advantage.

I claim:

Apparatus for discharging moist granular silica material, comprising a vertically arranged cylindrical container, a screw conveyor inside the container for feeding material therethrough, a conduit axially positioned relative to the container and adapted to supply gas under pressure at the discharge end of the container, said container having discharge openings positioned around the open end of said gas conduit, a conical shell surrounding the discharge end of the container, and a flexible hose leading from the conical shell whereby to discharge material from the container at various points without moving the container.

In testimony whereof, I sign my name.

WILLIAM ALLEN MILLER.